United States Patent [19]
Lin

[11] Patent Number: 5,660,943
[45] Date of Patent: Aug. 26, 1997

[54] INTEGRATED PRIMARY-AUXILIARY ELECTRODES FORMED ON CATALYTIC MESH-MATRIX-PLAQUE WITH SINGLE-SIDE-ACTIVE-SURFACE

[75] Inventor: Chu-Farn Lin, Nan-Tou County, Taiwan

[73] Assignee: Delta Green Energy, Hsinchu, Taiwan

[21] Appl. No.: 549,397

[22] Filed: Oct. 27, 1995

[51] Int. Cl.$^6$ ............................................. H01M 10/52
[52] U.S. Cl. ......................... 429/59; 427/123; 502/101
[58] Field of Search ............................ 429/59; 427/123, 427/201; 502/101

[56] References Cited

U.S. PATENT DOCUMENTS

| | | |
|---|---|---|
| 5,330,861 | 7/1994 | Fetcenko et al. ............... 429/59 X |
| 5,447,806 | 9/1995 | Hoge et al. ......................... 429/59 |
| 5,460,899 | 10/1995 | Charkey .............................. 429/59 |
| 5,480,741 | 1/1996 | Sakai et al. ......................... 429/59 |

*Primary Examiner*—Stephen Kalafut
*Attorney, Agent, or Firm*—Bo-In Lin

[57] ABSTRACT

An integrated primary-auxiliary electrode is provided for packaging into a battery container. The electrode includes a carrier substrate formed with a catalytic material. The electrode further includes a primary electrode which is formed on a first side of the carrier substrate with active electrochemical materials for carrying out a charging-discharging cycle for the battery. The electrode further includes an auxiliary electrode which is formed on a second side of the carrier substrate by exposing the catalytic material of the carrier substrate thus acting to reduce an internal pressure of the battery when packaged into a battery container.

10 Claims, 4 Drawing Sheets

INTEGRATED PRIMARY-AUXILIARY ELECTRODES FORMED ON CATALYTIC MESH-MATRIX-PLAQUE WITH SINGLE-SIDE-ACTIVE-SURFACE

BACKGROUND OF THE INVENTION

1. Field of the Invention

This invention relates generally to the electrode structure and manufacture processes of rechargeable batteries. More particularly, this invention relates to an improved structure and manufacture process of battery electrode to provide battery with better performance while reducing the battery internal pressure and providing a more streamline manufacture processes to produce batteries at lower cost.

2. Description of the Prior Art

High internal pressure in the sealed battery cells often creates a hazardous conditions, when the pressure exceeds certain thresholds, which becomes a severe product liability concern for battery manufactures. Especially, since the sealed battery cells are now being widely used for every conceivable consumer products, to assure that the internal cell pressure would not exceed a limit in its entire life becomes a public safety issue. However, in the design and manufacture of different types of batteries, the internal pressure caused by gases produced by chemical reactions in the discharge or charge cycles still is a major technical difficulty. The inability and lack of effective solution to this problem often limits the product yield and unnecessarily increases the production costs of batteries.

Matsumoto et al. disclose in U.S. Pat. No. 4,251,603 entitled 'Battery Electrode' (Issued on Feb. 17, 1981), a battery electrode includes a plaque made of a sponge-like porous metal matrix having a multiplicity of cells connected with each other three-dimensionally. The sectional area of the gratings making up the sponge-like metal porous plaque decreases continuously along the thickness of the plaque from the surface toward the central part and an active material is impregnated in the porous plaque. The object of the patented invention is to provide a battery electrode comprising a plaque of a sponge-like porous metal matrix with high density of an active material impregnated in the plaque and the plaque can be produced at a low cost. Matsumoto et al. disclose a fundamental method of making battery electrodes. The basic technique as disclosed however does not provide an electrode to reduce the gas-pressure generated from chemical reactions with the battery cells.

Dinker et al. disclose in U.S. Pat. No. 4,460,666, entitled "Coated Substrate, Preparation Thereof, and Use Thereof" (issued on Jul. 17, 1984), a conductive substrate with major surfaces embossed and with at least on of the surfaces processed with a sintered porous metal powder coating. The special embossed surface increases the sintering speed, provides better handling in electrochemical cleaning and impregnation, and strengthens the adhesion of the active material to the surfaces of the substrate thus improves the integrity of the electrode. The difficulty of high cell gas pressure are not resolved by the use of special electrodes formed with such coated substrate.

Kober et al. disclose in U.S. Pat. No. 4,707,911, entitled "Porous Electrodes and Method of Making Same" (issued on Nov. 24, 1987), porous electrodes for lead-add storage batteries without supporting plates or grids. Improved performance characteristics are achieved because these batteries are lighter in weight, having minimum internal resistance, providing higher rate of discharge, and more resistant to corrosion. The use of foams, metal nets, porous substrate, paste type of electrodes, and the fabrication methods of making those electrodes are disclosed in patents such as: U.S. Pat. Nos. 4,687,553, 5,455,125, 5,434,023, 5,434,019, 5,432,031, 5,405,719, 5,384,216, 5,374,491, 5,348,823, 5,329,681, 5,324,333, 5,248,510, 5,244,758, 5,098,544, 5,077,149, 4,978,431, 4,975,230, 4,957,543, and 4,929,520. These disclosures provides a broad spectrum of techniques of making improved electrodes and batteries. Yet, none of them provides a solution to the technical difficulties of high gas cell pressure in a sealed battery.

In order to reduce internal pressure, 'auxiliary electrodes' are employed. As disclosed in Section 13.3.3 in 'Battery Design' (See "Maintenance-Free Batteries-A Handbook of Battery Technology" by Brant, published by Research Study Press, Ltd. in year 1993) a prismatic sealed nickel-cadmium battery with auxiliary electrode is shown as that shown in FIG. 1. The negative (Cd) electrode is split into two plates, with an untilled nickel fiber electrode (A) interposed between the adjacent cadmium electrode. The negative electrodes are separated from a positive electrode (Ni) by spacers (S). The untilled plaque, i.e., the auxiliary electrode A, acts as a catalytic site for rapid oxygen reduction. The arrow indicated the main pathway for the oxygen in the gas phase to reach the untilled nickel substrate. As shown in FIG. 1, auxiliary electrode A which is composed by nickel fiber without impregnation are covered on both sides by the cadmium (Cd), i.e., the active hydrogen storage material for the negative electrode.

The basic configuration as that shown in FIG. 1 becomes a typical electrode configuration when nickel mesh or sponge-like porous metal matrix are used in forming the negative electrode with the nickel fiber serves as auxiliary electrode. Please refer to FIG. 2 for the structure of a conventional electrode 10. This conventional electrode 10 includes a three layer structure, i.e., a first active layer 20 and a second active layer 30 formed on two opposite sides of a carrier layer 40. The active layers 20 and 30 are generally formed with hydrogen storage alloys and the carrier layer 40 is typically formed with nickel mesh or sponge-like porous metal matrix. Such structure is commonly employed in the electrodes as disclosed in the above prior art patents. The difficulty of high internal cell pressure is not resolved by this type of electrode construction.

FIG. 3 shows an improved electrode 50 from the conventional electrode as shown in FIG. 2. The electrode 50 includes two primary electrodes consisting of a three layer structures, i.e., first primary electrode includes layers 60, 70, and 80, and second primary electrode includes layers 70, 80, and 90. These two primary electrodes are disposed on both sides, with an auxiliary electrode 95 disposed between them. The auxiliary electrode 95 provides a catalyst section to reduce the internal pressure. This configuration had the disadvantage that the manufacture of such an electrode is more complicate and more costly, and the surface areas provided for by the auxiliary electrode 95 is not sufficient to assure low internal pressure can be consistently achieved.

Therefore, a need still exists in the art of design and manufacture of battery electrodes to provide an improved structural configuration and method of fabrication of electrodes. The improved electrodes must be effective to reduce the internal gas pressure and is simple to fabricate such that the time and cost of manufacture can be reduced.

SUMMARY OF THE PRESENT INVENTION

It is therefore an object of the present invention to provide an integrated primary-auxiliary electrode formed on a catalytic mesh-matrix plaque with a single-side-active-surface configuration which would enable those of ordinary skill in the art to overcome the aforementioned difficulties and limitations encountered in the prior art.

Specifically, it is an object of the present invention to provide an integrated primary-auxiliary electrode formed on a catalytic mesh-matrix plaque with a single-side-active-surface configuration which provides simpler structure of the electrodes thus reducing the time and cost of battery manufacture.

Another object of the present invention is to provide an integrated primary-auxiliary electrode formed on a catalytic mesh-matrix plaque with a single-side-active-surface configuration wherein the auxiliary electrode is provided with bigger area such that the internal pressure of a rechargeable battery is effectively reduced.

Another object of the present invention is to provide an integrated primary-auxiliary electrode formed on a catalytic mesh-matrix plaque with a single-side-active-surface configuration for reducing the internal pressure thus eliminating the performance problems which may be caused by high internal pressures as that provided in the conventional batteries.

Briefly, in a preferred embodiment, the present invention includes an integrated primary-auxiliary electrode for packaging into a battery container. The electrode include a carrier substrate formed with a catalytic material for gas reduction. The electrode further includes a primary electrode which is formed on a first side of the carrier substrate with active electro-chemical materials for carrying out a charging-discharging cycle for the battery. The electrode further includes an auxiliary electrode which is formed on a second side of the carrier substrate by exposing the catalytic material of the carrier substrate thus acting to reduce an internal pressure of the battery when packaged into a battery container.

It is an advantage of the present invention that it provides an integrated primary-auxiliary electrode formed on a catalytic mesh-matrix plaque with a single-side-active-surface configuration which provides simpler structure of the electrodes thus reducing the time and cost of battery manufacture.

Another advantage of the present invention is that it provides an integrated primary-auxiliary electrode formed on a catalytic mesh-matrix plaque with a single-side-active-surface configuration wherein the auxiliary electrode is provided with bigger area such that the internal pressure of a rechargeable battery is effectively reduced.

Another advantage of the present invention is that it provides an integrated primary-auxiliary electrode formed on a catalytic mesh-matrix plaque with a single-side-active-surface configuration for reducing the internal pressure thus eliminating the performance problems which may be caused by high internal pressures as that provided in the conventional batteries.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
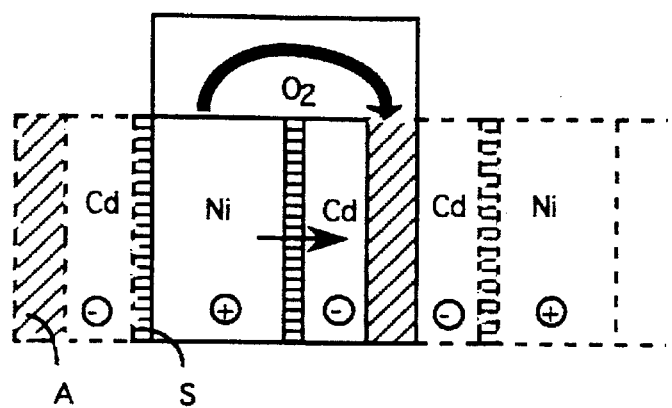
FIG. 1 diagram for showing the structure and function performed by the primary and auxiliary electrode in the prior art electrode.
Figure 2:
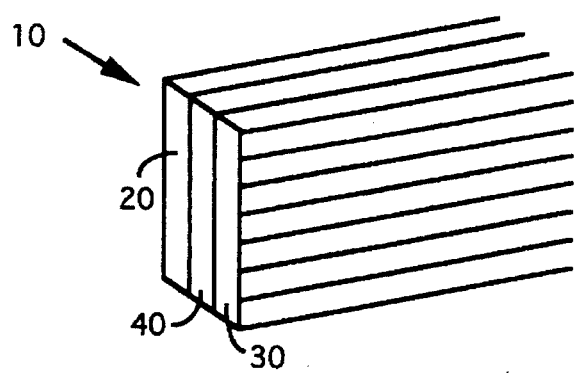
FIG. 2 is a partial perspective view of a conventional electrode which includes three layer structure to be packaged into a battery cell employed in a prior art battery.
Figure 3:
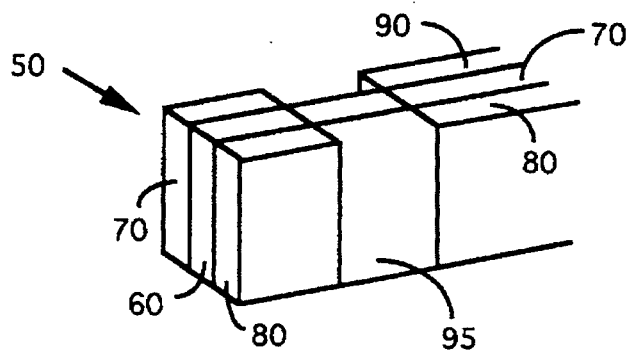
FIG. 3 is a partial perspective view of a negative electrode formed with an auxiliary electrode in a prior art electrode structure.
Figure 4:
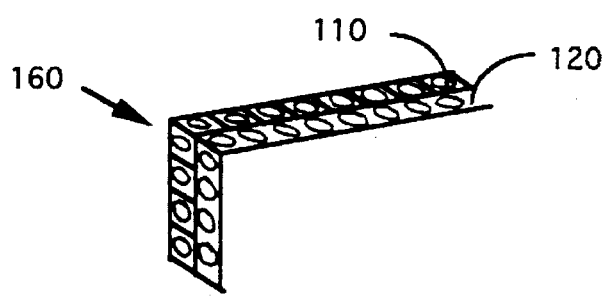
FIG. 4 is a perspective view of an integrated primary-auxiliary electrode of the present invention.

Referring to FIG. 4 for an electrode 100 which has a novel and improved structure according to the teaching of the present invention. The electrode 100 include an integrated primary electrode 110 and an auxiliary catalytic electrode 120 disposed on two side of the electrode 100. The primary electrode 110 is formed with active hydrogen storage material to perform hydrogen absorption and desorption during the charging and discharging cycles. The auxiliary electrode 120 which formed on the opposite side of the primary electrode 110 on the electrode 100 is composed of nickel mesh, sponge-like porous metal matrix or other types of catalytic layer provided for gas, e.g., hydrogen and oxygen, reduction.

Figure 5A:
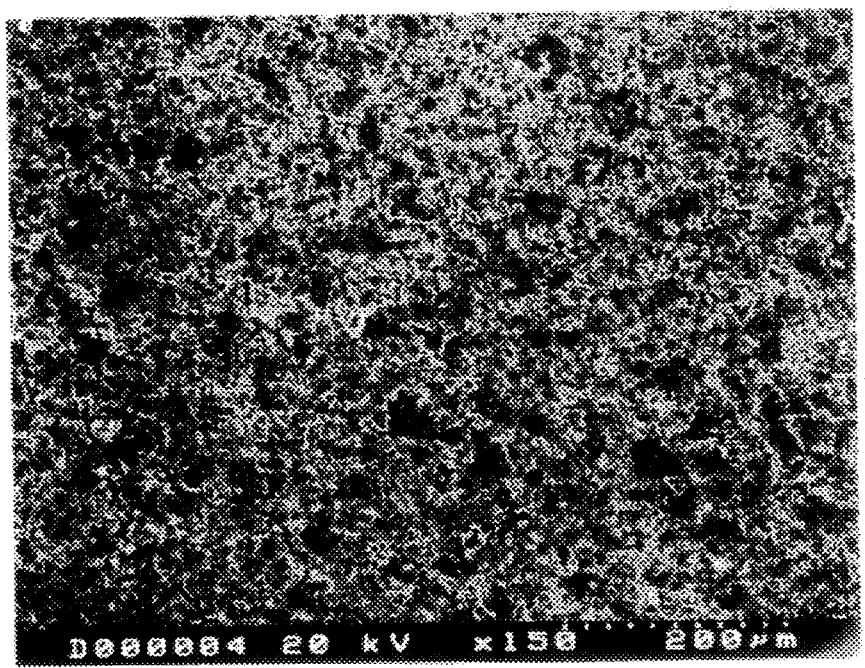
FIGS. 5A and 5B show the photographic images of microscopic structure of the surfaces for the primary electrode side and the auxiliary electrode side of the present invention.
Figure 5B:
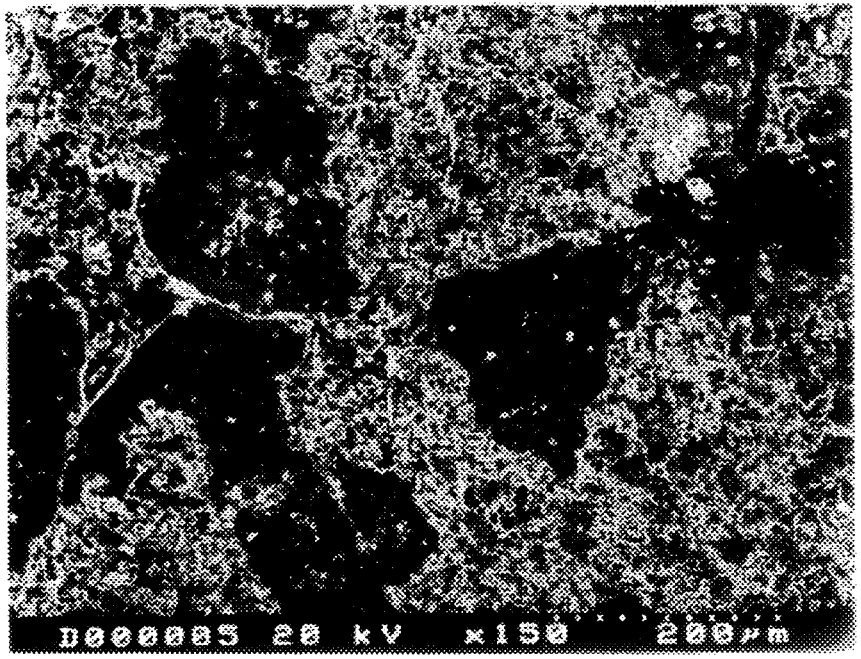

The advantage of the integrated primary-auxiliary electrode structure as that shown for the electrode 100 in FIG. 4 is the expanded area of the auxiliary electrode 120. This expanded area of the auxiliary electrode 120 serves as additional catalytic sites for enhancing the absorption of oxygen thus becomes very effective in reducing the internal pressure. FIGS. 5A and 5B show the microscopic pictures of the structure of the surface of the primary electrode 110 and the auxiliary electrode 120 respectively. On the surface of primary electrode 110, uniform distribution is shown for a hydrogen storage material such as typical $AB_2$ or $AB_5$ material combinations formed thereon. In contrast, on the surface of the auxiliary electrode 120, a non-uniform distribution is shown wherein the white spots represent the exposed nickel-mesh or the sponge-like porous metal matrix which can be used as catalytic sites for reducing the oxygen on the entire surface.

For the primary electrode which is formed on the first side of the integrated primary-auxiliary electrode, active hydrogen storage materials of $AB_2$ and $AB_5$ types of alloys can be applied which are disclosed in many U.S. Patents since 1980. Few examples of these inventions are: (1) U.S. Pat. No. 4,228,145 (issued on Oct. 14, 1980) claiming a hydrogen storage binary alloy. Laves phase intermetallic compound with a hexagonal MgZn2 (C14) type crystal structure with specified crystal structure parameters of a and c, and includes Zr & Mn, Ti & Mn, or Ti, Zr, & Mn. (2) U.S. Pat. No. 4,3710,163 (issued on Jan. 25, 1983) claiming a hydrogen storage alloy, $Ti_{1-x}A_xFe_{y-z}B_z$ wherein A is Hf & Zr, B is from Cr, Cu etc. (3) U.S. Pat. No. 4,551,400 (issued on Nov. 5, 1985) claiming active material for hydrogen storage electrode comprising the composition formula selected from the group consisting of: (a) $(TiV_{2-x}Ni_x)_{1-y}M_y$ where $0.2 \leq x \leq 1.0, 0.0 \leq y \leq 0.2$ & M=Al or Zr; (b) $Ti_{2-x}Zr_xV_{4-y}Ni_y$ where $0. \leq x \leq 1.5, 0.6 \leq y \leq 3.5$; (c) $Ti_{1-x}Cr_xV_{2-y}Ni_y$ where $0 \leq x \leq 0.75$, $0.2 \leq y \leq 0.1$; and (d) $TiV_{2-x}Ni_x$ where $0.4 \leq x 0.45$. (4) U.S. Pat. No. 4,656,023 (issued on Apr. 7, 1987) claiming a hydrogen storage material comprising a ternary alloy of $Zr_{1-x}Ti_xCrFe_y$ where $0.1 \leq x \leq 0.3$, $1.2 \leq y \leq 1.4$; (5) U.S. Pat. No. 4,699,856 (issued on Oct. 13, 1987) claiming a sealed rechargeable electrochemical cell includes a negative electrode which has a CaCu5-structure and the compositional formula $AB_mC_n$ where m+n is between 4.8 and 5.4, n is between 0.05 and 0.6 and (a) A consists of Mischmetall or one or more elements selected from the group consisting of Y, Ti, Hf, Zr, Ca, Th, La, and the remaining rare earth metals, in which the total atomic quantities of the elements Y, Ti, Hf, and Zr may not be more than 40% of A, Co) B consists of two or more elements selected from Ni, Co, Cu, Fe and Mn where the maximum atomic quantity per gram atom of A is for Ni:3.5, for Co:3.5, for Cu:3.5, for Fe 2.0, and for Mn:1.0, and (c) C consists of One or more elements selected from Al, Cr, & Si in the indicated atomic quantities: Al:0.05–0.6, Cr:0.05–0.5, and Si:0.05–0.5, characterized in that the electrochemically active material additionally comprises one or more metals selected from the group formed by P d, Pt, It, and Rh, the atomic quantity per gram atom of A being from 0.001 to 0.5; (6) U.S. Pat. No. 4,728,586 (issued on Mar. 1, 1988) claiming a hydrogen storage alloy with composition $(Ti_{2-x}Zr_xV_{4-y}Ni_y)Cr_{1-z}$ where $0.0 \leq x \leq 1.5$, $0.6 \leq y \leq 3.5$ & z is an effective amount less than 0.2, where at least one of the components is soluble in the alkaline media, and the alloy includes chromium as a modifier to inhibit the corrosion; and (7) U.S. Pat. No. 4,849,205 (issued on Jul. 18, 1989) claiming a material for hydride hydrogen storage and a hydride electrode, the material comprising composition formula selected from four groups consisting of alloys made from different combinations of Ti, Cr, Zr, Ni, V, Mn, etc. These active hydrogen storage materials are well known examples of alloy compositions which may be applied as to the surface on a surface of the substrate carrier to form a primary electrode.

Table 1 shows a comparison of the performance characteristics of a conventional electrode and an electrode of the present invention. Significant improvements are achieved in pressure reduction by the use of an integrated primary-auxiliary electrode 100 of the present invention. The greater catalytic active areas are provided for inducing and enhancing recombination are provide by the auxiliary electrode 120 which now constitutes the entire second surface of the electrode 120.

TABLE 1

Comparison of Internal Pressures in Battery Cells

| Battery Capacity | 1100 mAh | 1100 mAh |
|---|---|---|
| Positive Electrode | Sinter Process (1100 mAh) | Sinter Process (1100 mAh) |
| Negative Electrode | (1900 mAh) Conventional Electrode | (1900 mAh) Integrated Primary - Auxiliary Electrode |
| Internal Pressure | 20 to 30 Kg/cm² | 3 to 10 kg/cm² |
| Charging Condition for Pressure Measurement | 1100 mAh for 2 Hrs | 1100 mAh for 2 Hrs |

The present invention discloses an integrated primary-auxiliary electrode 100 which is for packaging into a battery container. The electrode 100 includes a carrier substrate 120 formed with a catalytic material. The electrode 100 further includes a primary electrode 110 which is formed on a first side of the carrier substrate with active electro-chemical materials for carrying out a charging-discharging cycle for the battery. The electrode 100 further includes an auxiliary electrode 120 which is formed on a second side of the carrier substrate 120 by exposing the catalytic material of the carrier substrate thus acting to reduce an internal pressure of the battery when packaged into a battery container.

Figure 6A:
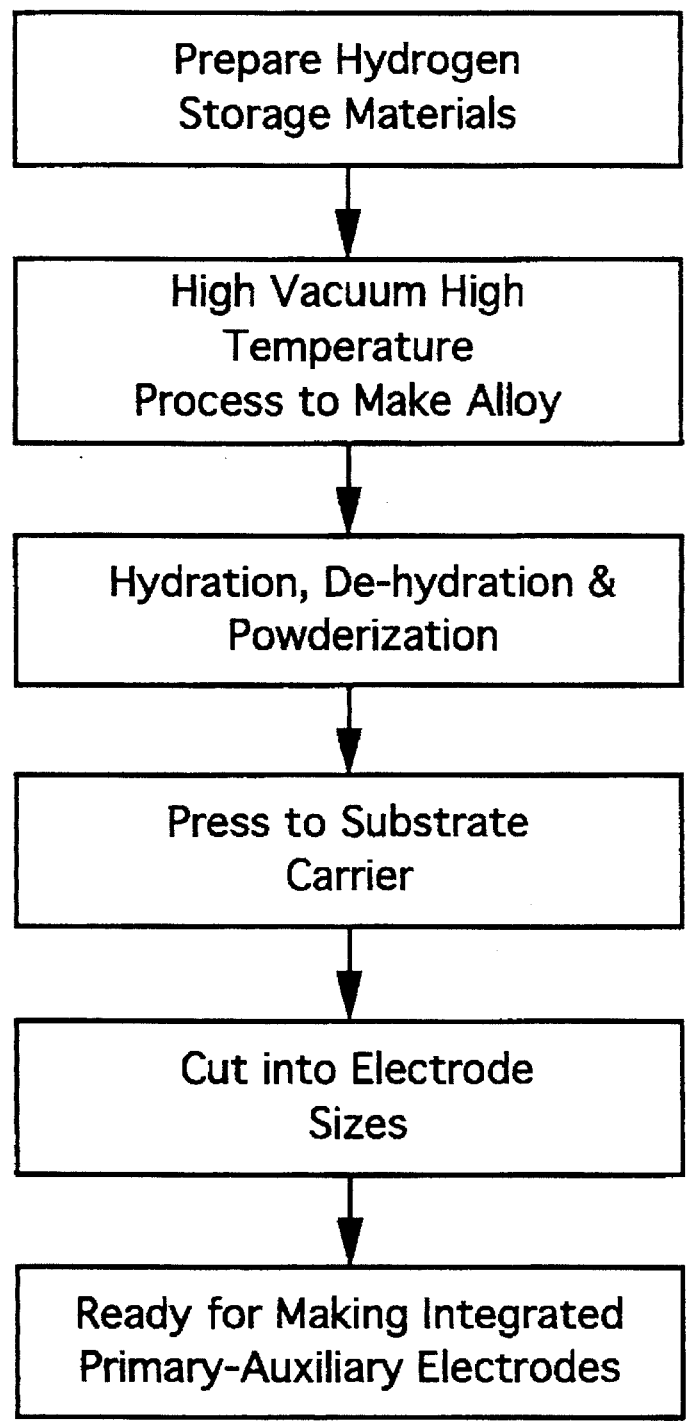
FIGS. 6A and 6B are flow charts showing the simplified dry and wet fabrication processes for making an integrated primary-auxiliary electrode of the present invention.
Figure 6B:
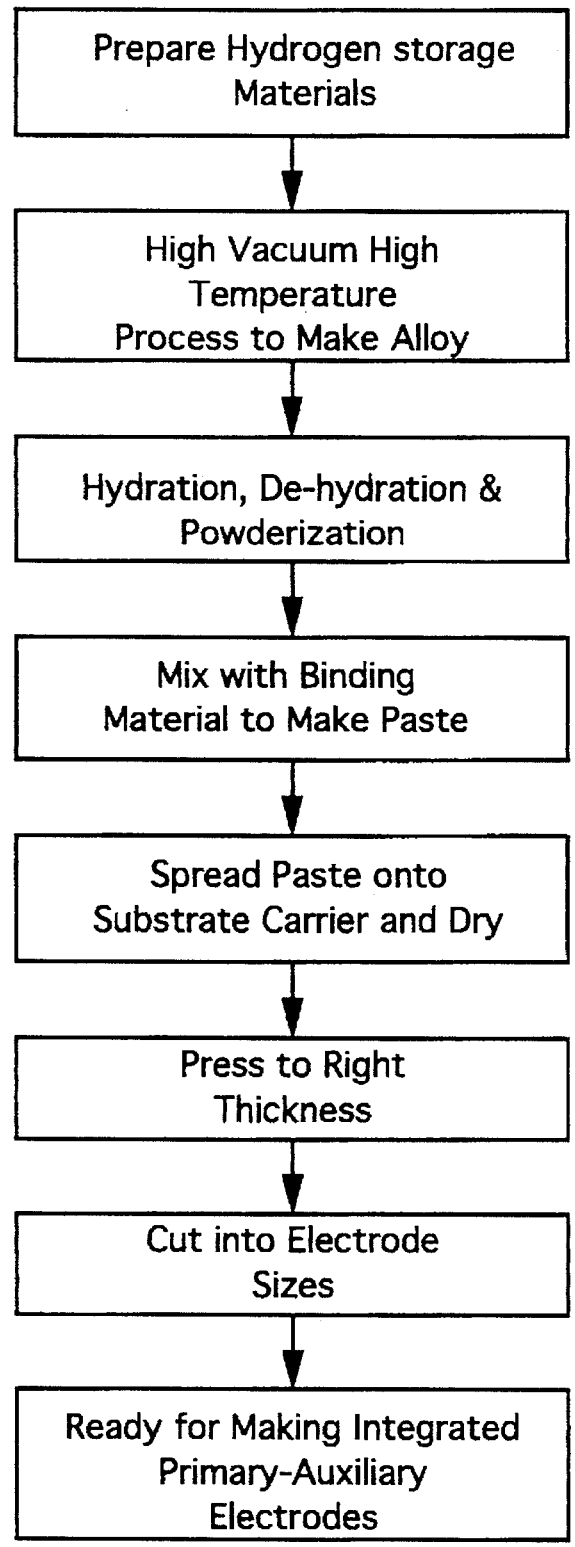

An integrated primary-auxiliary electrode 100 as that shown in FIG. 4 further provides an electrode structure which can be fabricated with simplified fabrication processes. The electrode can be fabricated by either a dry or wet process (see FIGS. 6A and 6B). In either processes the hydrogen storage material which can be of well known $AB_2$ or $AB_5$ combinations are first processed by performing high temperature high vacuum alloy metallurgy process. Mixture combinations of Mn, V, Cr, Zr, Ni, Ti, and other metal elements to form a hydrogen storage alloy are deposited into a graphite container which is then placed in a high vacuum condition of approximately $10^{-6}$ TORR. An inductive heating process is performed by melting these metals at about 1700° C. for more than thirty minutes. The melted alloy is poured into another container and cooled and then powderized by hydration and de-hydration processes. The alloy is further processed by ball-milling and crushed then sifted to form small particles in a particle size of approximately 70 μm in diameter. In a dry process, the hydrogen storage fine particles of alloys are mixed with additive agents such as binder composed of PTFE which is further evenly distributed over one surface of the carrier substrate. The alloy particles together with the additive agent are then pressed to formed a primary electrode surface on the carrier substrate. The integrated primary-auxiliary board are then cut into a desire size for making negative electrode. In a wet process, the hydrogen storage alloy particles are mixed with binding material to form a paste-like mixture. The paste mixture is then spread over a surface of the carrier substrate to form the primary electrode surface of the integrated primary-auxiliary electrode. The spread paste over the carrier substrate is then dried and pressed. Which is then sintered at 800° to 950° C. for about three hours or cured at 300° to 450° C. for about one to three hours. The processed sample is then cut to a desirable size for making the negative electrode thus completing the wet process of making an integrated primary-auxiliary electrode. This one-sided structure with only one of the two surfaces formed with an active hydrogen storage layer which is either being spread or pressed thereon simplify the fabrication process and reduce the cost of electrode fabrication.

Therefore, the present invention discloses an integrated primary-auxiliary electrode formed on a catalytic mesh-matrix plaque with a single-side-active-surface configuration which would enable those of ordinary skill in the art to overcome the difficulties and limitations encountered in the prior art. Specifically, the integrated primary-auxiliary electrode formed on a catalytic mesh-matrix plaque with a single-side-active-surface configuration as disposed in this invention provides simpler structure of the electrodes thus reducing the time and cost of battery manufacture. Additionally, on this integrated primary-auxiliary electrode which is formed on a catalytic mesh-matrix plaque with a single-side-active-surface, an entire catalytic surface is used as the auxiliary electrode which provides bigger area as an auxiliary electrode such that the internal pressure of a rechargeable battery can be effectively reduced. Furthermore, by the use of the electrodes as provided in this invention, with the reduced internal pressure in the rechargeable batteries, many of the performance problems caused by the pressure difficulties as encountered in the conventional batteries are eliminated.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A finished integrated primary-auxiliary electrode ready for packaging into a battery container, said electrode comprising:

a carrier substrate of limited permeability formed with a catalytic material;

a primary electrode formed, on a first side of said carrier substrate of limited permeability, with active electro-chemical materials for carrying out a charging-discharging cycle for said battery wherein said active electro-chemical materials do not permeate to a second side opposite said first side of said substrate of limited permeability; and an auxiliary electrode formed on said second side of said carrier substrate of limited permeability, said auxiliary electrode composed substantially of said catalytic material of said carrier substrate thus providing substantially an entire catalytic surface on said second side of said carrier substrate for said auxiliary electrode.

2. The finished electrode of claim 1 wherein:

said carrier substrate of limited permeability formed with catalytic material composed of a fiber substrate coated with catalytic metal materials; and said primary electrode is formed by impregnating said first side of said carrier substrate of limited permeability with active electro-chemical materials.

3. The finished electrode of claim 2 wherein:

said catalytic metal materials containing a nickel metal; and said primary electrode is formed by impregnating active hydrogen storage alloys on said first side of said nickel metal mesh.

4. A finished integrated primary-auxiliary electrode ready for packaging into a battery container as a negative electrode, said negative electrode comprising:

a carrier substrate of limited permeability formed with a catalytic material;

a primary electrode formed, on a first side of said carrier substrate, with active hydrogen storage materials for carrying out a charging-discharging cycle for said battery wherein said active electro-chemical materials do not permeate to a second side opposite said first side of said substrate of limited permeability; and an auxiliary electrode formed on said second side of said carrier substrate, said auxiliary electrode composed substantially of said catalytic material of said carrier substrate thus providing substantially an entire catalytic surface on said second side of said carrier substrate for said auxiliary electrode.

5. The finished negative electrode of claim 4 wherein:

said carrier substrate of limited permeability formed with catalytic material composed of a fiber substrate coated with catalytic metal materials; and said primary electrode is formed by impregnating said first side of said carrier substrate of limited permeability with active electro-chemical materials.

6. The finished negative electrode of claim 5 wherein:

said catalytic metal mesh is a nickel metal mesh; and said primary electrode is formed by impregnating active hydrogen storage $AB_2$ type of alloys on said first side of said nickel metal mesh wherein A representing mischmetal or one or more elements selected from a group consisting of Y, Ti, Hf, Zr, Ca, Th, La and remaining rare earth metals, and B representing elements selected from Ni, Co, Cu, Fe, Al, Cr, V, and Mn.

7. The finished negative electrode of claim 5 wherein:

said catalytic metal materials containing a nickel metal; and said primary electrode is formed by impregnating active hydrogen storage $AB_5$ type of alloys on said first side of said first side of said carrier substrate with limited permeability wherein A representing mischmetal or one or more elements selected from a group consisting of Y, Ti, Hf, Zr, Ca, Th, La and remaining rare earth metals, and B representing elements selected from Ni, Co, Cu, Fe, Al, Cr, V, and Mn.

8. A method for fabricating a finished integrated primary-auxiliary electrode ready for packaging into a battery container, said method of fabrication comprising:

(a) forming a carrier substrate of limited permeability with a catalytic material;

(b) forming a primary electrode on a first side of said carrier substrate with active electro-chemical materials for carrying out a charging-discharging cycle for said battery wherein said active electro-chemical materials do not permeate to a second side opposite said first side of said substrate of limited permeability; and (c) forming an auxiliary electrode on said second side of said carrier substrate by keeping said second side of said carrier substrate substantially free of said active electro-chemical materials in performing said step (b) thus providing an entire catalytic surface on said second side of said carrier substrate as said auxiliary electrode.

9. The method of fabricating said finished electrode of claim 8 wherein:

said step (a) of forming a carrier substrate with catalytic material is a step of forming a carrier substrate by coating a catalytic metal material on a fiber substrate; and said step (b) of forming a primary electrode on a first side of said carrier substrate is a step of impregnating said first side of said carrier substrate of limited permeability with active electro-chemical materials.

10. The method of fabricating said finished electrode of claim 9 wherein:

said step (a) of forming a carrier substrate of limited permeability with a catalytic metal material is a step of said coating first side of said carrier substrate with a material containing nickel; and said step (b) of forming a primary electrode by impregnating said first side of said carrier substrate with active electro-chemical materials is a step of impregnating active hydrogen storage alloys on said first side of said first side of substrate carrier of limited permeability.

* * * * *